US007589916B2

(12) United States Patent
Kim et al.

(10) Patent No.: US 7,589,916 B2
(45) Date of Patent: *Sep. 15, 2009

(54) MICROMIRROR ARRAY WITH IRIS FUNCTION

(75) Inventors: Hye Young Kim, Jeonbuk (KR); Jin Young Sohn, Fullerton, CA (US); Gyoung Il Cho, Seoul (KR); Cheong Soo Seo, Seongnam (KR)

(73) Assignees: Angstrom, Inc., Seongnam (KR); Stereo Display, Inc., Anaheim, CA (US)

( * ) Notice: Subject to any disclaimer, the term of this patent is extended or adjusted under 35 U.S.C. 154(b) by 34 days.

This patent is subject to a terminal disclaimer.

(21) Appl. No.: 11/837,448

(22) Filed: Aug. 10, 2007

(65) Prior Publication Data
US 2009/0040586 A1 Feb. 12, 2009

(51) Int. Cl.
G02B 9/08 (2006.01)
G02B 26/00 (2006.01)
(52) U.S. Cl. .................... 359/739; 359/290
(58) Field of Classification Search ............. 359/198, 359/212, 223–225, 290, 298, 738, 739
See application file for complete search history.

(56) References Cited

U.S. PATENT DOCUMENTS

| 2,002,376 | A | 5/1935 | Mannhelmer |
| 4,407,567 | A | 10/1983 | Michelet et al. |
| 4,834,512 | A | 5/1989 | Austin |
| 4,853,787 | A | 8/1989 | Kurth |
| 4,944,580 | A | 7/1990 | MacDonald |
| 5,004,319 | A | 4/1991 | Smither |
| 5,172,235 | A | 12/1992 | Wilm |
| 5,212,555 | A | 5/1993 | Stoltz |
| 5,369,433 | A | 11/1994 | Baldwin et al. |
| 5,402,407 | A | 3/1995 | Eguchi |
| 5,467,121 | A | 11/1995 | Allcock |
| 5,612,736 | A | 3/1997 | Vogeley |
| 5,661,518 | A | 8/1997 | Palm |
| 5,696,619 | A | 12/1997 | Knipe |
| 5,748,199 | A | 5/1998 | Palm |
| 5,881,034 | A | 3/1999 | Mano |
| 5,897,195 | A | 4/1999 | Choate |
| 5,986,811 | A | 11/1999 | Wohlstadter |
| 6,025,951 | A | 2/2000 | Swart |
| 6,028,689 | A | 2/2000 | Michalicek et al. |
| 6,064,423 | A | 5/2000 | Geng |
| 6,084,843 | A | 7/2000 | Abe |
| 6,104,425 | A | 8/2000 | Kanno |
| 6,111,900 | A | 8/2000 | Suzudo |
| 6,123,985 | A | 9/2000 | Robinson |
| 6,233,087 | B1 | 5/2001 | Hawkins |

(Continued)

FOREIGN PATENT DOCUMENTS

JP 08-043881 2/1996

(Continued)

*Primary Examiner*—William C Choi

(57) ABSTRACT

The present invention provides a micromirror array with iris function that comprises a plurality of micromirrors and is configured to provide an adjustable aperture having a plurality of aperture sizes by controlling motions of the micromirrors. The adjustable aperture controls the amount of incident light admitted to an image sensor by changing the aperture size. Also, the micromirrors comprised in the aperture forms a Micromirror Array Lens having variable focusing function.

41 Claims, 10 Drawing Sheets

U.S. PATENT DOCUMENTS

| | | |
|---|---|---|
| 6,282,213 B1 | 8/2001 | Gutin |
| 6,304,263 B1 | 10/2001 | Chiabrera |
| 6,315,423 B1 | 11/2001 | Yu |
| 6,329,737 B1 | 12/2001 | Jerman |
| 6,329,963 B1 | 12/2001 | Chiabrera |
| 6,421,081 B1 | 7/2002 | Markus |
| 6,438,272 B1 | 8/2002 | Huang |
| 6,498,673 B1 | 12/2002 | Frigo |
| 6,507,366 B1 | 1/2003 | Lee |
| 6,549,730 B1 | 4/2003 | Hamada |
| 6,600,591 B2 | 7/2003 | Anderson |
| 6,611,343 B1 | 8/2003 | Frankowski |
| 6,618,209 B2 | 9/2003 | Nishioka |
| 6,625,342 B2 | 9/2003 | Staple |
| 6,649,852 B2 | 11/2003 | Chason |
| 6,650,461 B2 | 11/2003 | Atobe |
| 6,658,208 B2 | 12/2003 | Watanabe |
| 6,711,319 B2 | 3/2004 | Hoen |
| 6,741,384 B1 | 5/2004 | Martin |
| 6,781,731 B2 | 8/2004 | Choi |
| 6,781,732 B2 | 8/2004 | Cho |
| 6,784,771 B1 | 8/2004 | Fan |
| 6,801,260 B1 | 10/2004 | Veksland |
| 6,804,429 B2 | 10/2004 | Yu |
| 6,833,938 B2 | 12/2004 | Nishioka |
| 6,836,459 B2 | 12/2004 | Komoto |
| 6,870,660 B2 | 3/2005 | DiCarlo |
| 6,885,819 B2 | 4/2005 | Shinohara |
| 6,900,901 B2 | 5/2005 | Harada |
| 6,900,922 B2 | 5/2005 | Aubuchon |
| 6,906,848 B2 | 6/2005 | Aubuchon |
| 6,906,849 B1 | 6/2005 | Mi |
| 6,909,453 B2 | 6/2005 | Mochizuki |
| 6,914,712 B2 | 7/2005 | Kurosawa |
| 6,919,982 B2 | 7/2005 | Nimura |
| 6,934,072 B1 | 8/2005 | Kim |
| 6,934,073 B1 | 8/2005 | Kim |
| 6,943,950 B2 | 9/2005 | Lee |
| 6,944,103 B2 | 9/2005 | Hong |
| 6,956,687 B2 | 10/2005 | Moon |
| 6,958,777 B1 | 10/2005 | Pine |
| 6,970,284 B1 | 11/2005 | Kim |
| 6,971,116 B2 | 11/2005 | Takeda |
| 6,985,299 B2 | 1/2006 | Bakin |
| 6,995,897 B2 | 2/2006 | Mushika |
| 6,995,909 B1 | 2/2006 | Hayashi |
| 6,999,226 B2 | 2/2006 | Kim |
| 7,009,561 B2 | 3/2006 | Menache |
| 7,019,376 B2 | 3/2006 | Patel |
| 7,023,466 B2 | 4/2006 | Favalora |
| 7,025,461 B2 | 4/2006 | Veligdan |
| 7,027,207 B2 | 4/2006 | Huibers |
| 7,031,046 B2 | 4/2006 | Kim |
| 7,046,447 B2 | 5/2006 | Raber |
| 7,057,826 B2 | 6/2006 | Cho |
| 7,068,415 B2 | 6/2006 | Mushika |
| 7,068,416 B2 | 6/2006 | Gim |
| 7,077,523 B2 | 7/2006 | Seo |
| 7,079,325 B2 | 7/2006 | Konno |
| 7,088,493 B2 | 8/2006 | Alain |
| 7,091,057 B2 | 8/2006 | Gan |
| 7,127,136 B2 | 10/2006 | Hall |
| 7,161,729 B2 | 1/2007 | Kim |
| 7,164,465 B2 | 1/2007 | Klosner |
| 7,173,653 B2 | 2/2007 | Gim |
| 7,184,192 B2 | 2/2007 | Sandstrom |
| 7,195,163 B2 | 3/2007 | Yoo |
| 7,209,286 B2 | 4/2007 | Mann |
| 7,212,330 B2 | 5/2007 | Seo |
| 7,215,882 B2 | 5/2007 | Cho |
| 7,239,438 B2 | 7/2007 | Cho |
| 7,245,325 B2 | 7/2007 | Yamaguchi |
| 7,245,363 B2 | 7/2007 | Mushika |
| 7,261,417 B2 | 8/2007 | Cho |
| 7,267,447 B2 | 9/2007 | Kim |
| 7,274,517 B2 | 9/2007 | Cho |
| 7,306,344 B2 | 12/2007 | Abu-Ageel |
| 7,315,503 B2 | 1/2008 | Cho |
| 7,333,260 B2 | 2/2008 | Cho |
| 7,339,746 B2 | 3/2008 | Kim |
| 7,354,167 B2 | 4/2008 | Cho |
| 7,355,627 B2 | 4/2008 | Yamazaki |
| 7,370,412 B2 | 5/2008 | Hiraoka |
| 2003/0174234 A1 | 9/2003 | Kondo |
| 2004/0021802 A1 | 2/2004 | Yoshino |
| 2004/0184146 A1 | 9/2004 | Uehara |
| 2004/0207768 A1 | 10/2004 | Liu |
| 2005/0206773 A1 | 9/2005 | Kim |
| 2005/0207486 A1 | 9/2005 | Lee |
| 2005/0212856 A1 | 9/2005 | Temple |
| 2005/0259158 A1 | 11/2005 | Jacob |
| 2006/0007301 A1 | 1/2006 | Cho |
| 2006/0120706 A1 | 6/2006 | Cho |
| 2006/0146140 A1 | 7/2006 | Kennedy |
| 2006/0209439 A1 | 9/2006 | Cho |
| 2006/0256332 A1 | 11/2006 | Sandstrom |
| 2007/0263113 A1 | 11/2007 | Baek |
| 2008/0049291 A1* | 2/2008 | Baek et al. .................. 359/223 |

FOREIGN PATENT DOCUMENTS

| | | |
|---|---|---|
| JP | 11-069209 | 3/1999 |
| JP | 2002-288873 | 10/2002 |

* cited by examiner

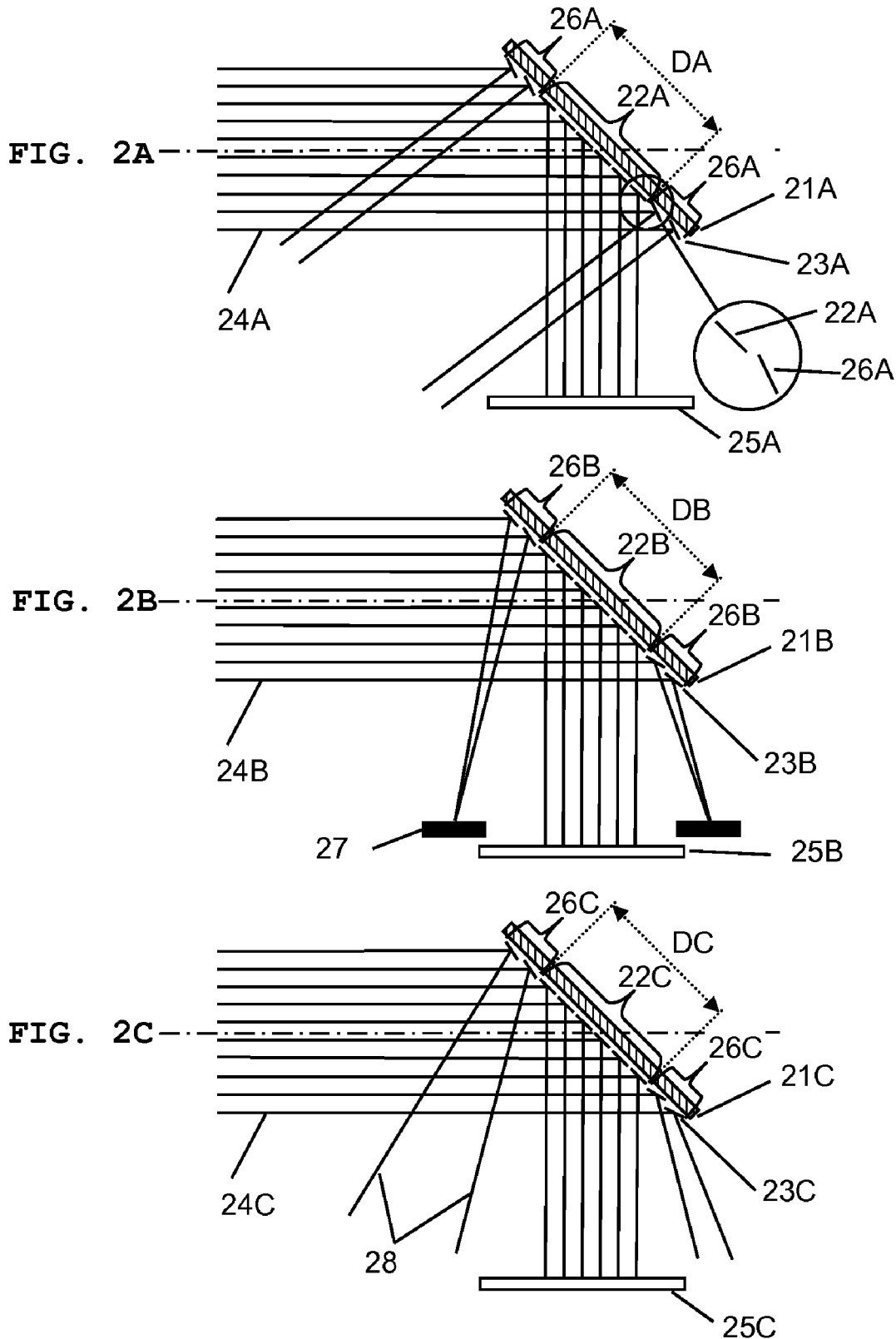

MICROMIRROR ARRAY WITH IRIS FUNCTION

FIELD OF INVENTION

The present invention relates to an iris device, more particularly, to an iris device having an adjustable aperture and/or an adjustable focal length.

BACKGROUND OF INVENTION

Imaging system requires an adjustable aperture in order to regulate the amount of light admitted to the imaging system.

The conventional imaging system uses iris diaphragm devices to adjust the aperture, wherein a plurality of mechanical movable blades are attached to a mount in an imaging system and rotations of the blades make the size of apertures changed. These mechanical iris diaphragm devices present many problems. They tend to suffer from wear and tear by repeated uses and have shock and noise problems. Also, due to its macroscopic moving structure, they draw high power and make the imaging system bulky. Furthermore, the aperture changing speed is low, which can be a critical problem for high frame rate imaging systems or auto-focusing imaging systems having an auto exposure feature.

To resolve these problems caused by the mechanical iris diaphragm, U.S. Pat. No. 3,955,208 to Wick discloses a liquid crystal diaphragm, wherein an aperture size is changed by changing the transparency of at least one portion of one or more bodies of liquid crystal. The liquid crystal diaphragm device, however, has a limited diaphragm changing rate as well as a low contrast rate. Also, this device cannot provide a focusing capability.

While the liquid crystal diaphragm is a transmittive type light modulator, the reflective type light modulator such DMD (Digital Micromirror Device) have been used as light shutters as disclosed U.S. Pat. No. 6,900,901 to Harada. In conventional micromirror devices, each micromirror has bistable states (on and off), wherein when a micromirror is on, the incident light is reflected to a designated area and when the micromirror is off, the incident light is reflected to a light absorber. These micromirror devices are used as a shutter device rather than an iris device. Also, the conventional micromirror device does not have a focusing capability because of its limited motion range.

SUMMARY OF INVENTION

The present invention provides a micromirror array with iris function that comprises a plurality of micromirrors and is configured to provide an adjustable aperture having a plurality of aperture sizes by controlling motions of the micromirrors. The general principle, structure and methods for making the micromirror array devices and Micromirror Array Lens are disclosed in U.S. patent application Ser. No. 10/872,241 filed Jun. 18, 2004, U.S. patent application Ser. No. 11/072,597 filed Mar. 4, 2005, U.S. patent application Ser. No. 11/347,590 filed Feb. 4, 2006, U.S. patent application Ser. No. 11/369,797 filed Mar. 6, 2006, U.S. patent application Ser. No. 11/426,565 filed Jun. 26, 2006, U.S. patent application Ser. No. 11/463,875 filed Aug. 10, 2006, U.S. patent application Ser. No. 11/534,613 filed Sep. 22, 2006, U.S. patent application Ser. No. 11/534,620 filed Sep. 22, 2006, U.S. patent application Ser. No. 11/549,954 filed Oct. 16, 2006, U.S. patent application Ser. No. 11/609,882 filed Dec. 12, 2006, U.S. patent application Ser. No. 11/685,119 filed Mar. 12, 2007, U.S. patent application Ser. No. 11/693,698 filed Mar. 29, 2007, and U.S. patent application Ser. No. 11/742,510 filed Apr. 30, 2007, all of which are incorporated herein by references.

An iris device changes its aperture size to regulate an amount of light admitted to an area of interest such as an image sensor. In the present invention, the micromirror array comprising a plurality of micromirrors works as the iris device, wherein the amount of light admitted to the area of interest is regulated by motions of the micromirrors.

A micromirror array with iris function of the present invention comprises a plurality of micromirrors and is configured to provide an adjustable aperture having a plurality of aperture sizes by controlling motions of the micromirrors. The adjustable aperture controls the amount of incident light admitted to an image sensor by changing the aperture size.

To provide the adjustable aperture, two groups of micromirrors are selected from the micromirror array for each aperture size. One group of micromirrors has active micromirrors forming an aperture and the other group of micromirrors has inactive micromirrors located out of the aperture formed by the active micromirrors. The active micromirrors are controlled to reflect incident light onto the image sensor while the inactive micromirrors are controlled to reflect incident light out of the image sensor.

Therefore, each micromirror has to be configured to have at least two motions. A group of the active micromirrors comprised in each aperture size can be predetermined. By simply changing the group of the active micromirrors, the aperture size can be changed discretely. The micromirror array with iris function of the present invention can further comprise at least one optical block to absorb incident light reflected by the inactive micromirrors.

As a simple iris application, the micromirrors in the micromirror array can be configured to have substantially identical motions when the micromirrors are active. Also, the micromirrors in the micromirror array can be configured to have substantially identical motions when the micromirrors are inactive. When the micromirrors change their statuses, some noticeable light traversal patterns may occur on an image (e.g. radial traversal pattern). To avoid this problem, the micromirrors can be configured to have random motions when the micromirrors are inactive in order to reflect incident light to random directions out of the image sensor.

To provide a multi-functional lens system, the micromirrors can be configured to have independent motions. The active micromirrors form a Micromirror Array Lens having at least one optical surface profile by controlling motions of the active micromirrors. The general principle and methods for making the Micromirror Array Lens using micromirror array are disclosed in U.S. Pat. No. 6,970,284 issued Nov. 29, 2005 to Kim, U.S. Pat. No. 7,031,046 issued Apr. 18, 2006 to Kim, U.S. Pat. No. 6,934,072 issued Aug. 23, 2005 to Kim, U.S. Pat. No. 6,934,073 issued Aug. 23, 2005 to Kim, U.S. Pat. No. 7,161,729 issued Jan. 9, 2007, U.S. Pat. No. 6,999,226 issued Feb. 14, 2006 to Kim, U.S. Pat. No. 7,239,438 issued Jul. 3, 2007 to Cho, U.S. Pat. No. 7,095,548 issued Aug. 22, 2006 to Cho, U.S. patent application Ser. No. 10/983,353 filed Nov. 8, 2004, U.S. patent application Ser. No. 11/076,616 filed Mar. 10, 2005, and U.S. patent application Ser. No. 11/426,565 filed Jun. 26, 2006, all of which are incorporated herein by references.

The Micromirror Array Lens for each aperture size is a variable focal length lens forming a plurality of optical surface profiles. In order for the Micromirror Array Lens to function as a lens, each optical surface profile of the Micromirror Array Lens satisfies convergence condition and/or phase matching condition. Also the focal length of the Micromirror Array Lens can discretely be changed as the optical surface profile is changed. Also the general properties of the Micromirror Array Lens are disclosed in U.S. Pat. No. 7,057, 826 issued Jun. 6, 2006 to Cho, U.S. Pat. No. 7,173,653 issued Feb. 6, 2007, U.S. Pat. No. 7,215,882 issued May 8, 2007 to Cho, U.S. Pat. No. 7,236,289 issued Jun. 26, 2007 to Baek, U.S. patent application Ser. No. 10/979,568 filed Nov. 2, 2004, U.S. patent application Ser. No. 11/218,814 filed Sep. 2, 2005, U.S. patent application Ser. No. 11/382,273 filed May 9, 2006, and U.S. patent application Ser. No. 11/429,034 filed May 5, 2006, and its application are disclosed in U.S. Pat. No. 7,077,523 issued Jul. 18, 2006 to Seo, U.S. Pat. No. 7,068,416 issued Jun. 27, 2006 to Gim, U.S. patent application Ser. No. 10/914,474 filed Aug. 9, 2004, U.S. patent application Ser. No. 10/934,133 filed Sep. 3, 2004, U.S. patent application Ser. No. 10/979,619 filed Nov. 2, 2004, U.S. patent application Ser. No. 10/979,624 filed Nov. 2, 2004, U.S. patent application Ser. No. 11/076,688 filed Mar. 10, 2005, U.S. patent application Ser. No. 11/208,114 filed Aug. 19, 2005, U.S. patent application Ser. No. 11/208,115 filed Aug. 19, 2005, U.S. patent application Ser. No. 11/382, 707 filed May 11, 2006, U.S. patent application Ser. No. 11/419,480 filed May 19, 2006, and U.S. patent application Ser. No. 11/423,333 filed Jun. 9, 2006, all of which are incorporated herein by references.

The optical surface profile of the Micromirror Array Lens can simulate an arbitrary surface shape; e.g. rotationally symmetric optical surface profiles, line symmetric optical surface profiles, aspheric optical surface profiles, or anamorphic optical surface profiles. The optical surface profile of the Micromirror Array Lens has to be formed based on the optical arrangement of the imaging system.

The aperture size is one of the important variables to control the optical properties of a lens system such as f-number and depth of field. The effective f-number of the lens system is a measurement of lens speed and can be controlled by changing the aperture size, wherein larger the aperture size, smaller the f-number. The depth of field is the range of distance in the object side that the image of an object appears in focus. The depth of field is proportional to the f-number of the lens system. In order to provide a specified depth of field, the aperture size has to be changed according to the focal length of the lens system. Thus, the micromirror array of the present invention can be configured to change the aperture size with respect to the focal length of the Micromirror Array Lens.

Even though the Micromirror Array Lens formed by the micromirror array is a variable focal length lens, the distance between the Micromirror Array Lens and the image plane can be fixed. In this case, the focal length of the Micromirror Array Lens has to be changed as the distance between the Micromirror Array Lens and an object (object distance) is changed. In order to provide a specified depth of field, the micromirror array has to be configured to change the aperture size with respect to an object distance.

Some electronic image sensors such as CCD or CMOS sensors have a capability of controlling the amount of light admitted to the sensor by using electronic shutter function, wherein a reset time and exposure time of each column or pixel in the image sensor can be controlled. For simultaneous integration and read-out for those sensors, however, the conventional imaging systems have to use an additional mechanical shutter at the cost of larger volume and mass, higher cost, and higher complexity.

The micromirror array with iris function of the present invention can provide simultaneous integration and read-out of the image sensors without yielding those negative effects and also precisely regulates the amount of light admitted to the image sensor. The micromirror array of the present invention is configured to change its aperture size with synchronization of an exposure of the image sensor. Also, the micromirror array can be configured to change its aperture size during an exposure time of the image sensor. Furthermore, the motions of the micromirrors can be controlled to prevent over-exposure of the image sensor.

More specifically, the motions of the micromirrors are controlled to prevent over-exposure of the image sensor by changing an exposure time of the aperture. The micromirror array can be configured such that all the micromirrors are inactive after exposure time of the image sensor, although it is not necessarily required for some applications such as some video cameras.

The micromirror array with iris function of the present invention can form various aperture shapes as well as various aperture sizes. The micromirror array can readily form virtually any shapes of the aperture using simple shaped micromirrors such as fan shape, triangular shape, square shape, or hexagonal shape. When required aperture sizes are predetermined, the shape and arrangement of micromirrors can be optimized to provide the required aperture sizes.

In stead of providing a plurality of fixed size Micromirror Array Lenses, the micromirror array of the present invention can form a Micromirror Array Lens with iris function. The Micromirror Array Lens with iris function of the present invention comprises a plurality of micromirrors, configured to provide an adjustable aperture having a plurality of aperture sizes by controlling motions of the micromirrors, wherein the amount of incident light admitted to an image sensor can be changed as the aperture size of the Micromirror Array Lens is changed.

The aperture size of the Micromirror Array Lens is changed by selecting two groups of micromirrors from the Micromirror Array Lens. One group of micromirrors has active micromirrors forming an aperture of the Micromirror Array Lens and the other group of micromirrors has inactive micromirrors located out of the aperture formed by the active micromirrors. The active micromirrors are controlled to reflect incident light onto the image sensor and the inactive micromirrors are controlled to reflect incident light out of the image sensor. The micromirrors are configured to have independent motions. The aperture size of the Micromirror Array Lens can be changed discretely.

The Micromirror Array Lens with the adjustable aperture is a variable focal length lens forming a plurality of optical surface profiles by controlling motions of the active micromirrors. Each optical surface profile of the Micromirror Array Lens satisfies convergence and phase matching conditions. The optical surface profile of the Micromirror Array Lens simulates an arbitrary surface shape. The Micromirror Array Lens is configured to change the aperture size with respect to the focal length of the Micromirror Array Lens. The focal length of the Micromirror Array Lens discretely changes as the optical surface profile changes. The micromirror array Lens is configured to change the aperture size with respect to an object distance.

An optical axis of the Micromirror Array Lens is changed by controlling motions of the active micromirrors. The Micromirror Array Lens can further comprise at least one optical block to absorb incident light reflected by the inactive micromirrors.

The micromirror array with iris function of the present invention has the many advantages: (1) the system changes an aperture with fast response time; (2) the system provides lens function and iris function simultaneously; (3) the system has a simple structure without macroscopic moving parts for adjusting aperture size, focal length, and optical axis; (4) The system has low power consumption since the micromirror array is actuated by electrostatic force.

Although the present invention is briefly summarized herein, the full understanding of the invention can be obtained by the following drawings, detailed description, and appended claims.

DESCRIPTION OF THE FIGURES

These and other features, aspects, and advantages of the present invention will become better understood with reference to the accompanying drawings, wherein:

FIGS. 2A-2C show various exemplary embodiments using the micromirrors having two motions.

DETAILED DESCRIPTION OF THE ILLUSTRATED EMBODIMENTS

An iris device changes its aperture size to regulate the amount of light admitted to an area of interest such as an image sensor. In the present invention, the micromirror array comprising a plurality of micromirrors works as the iris device, wherein the amount of light admitted to the area of interest is regulated by motions of the micromirrors.

Figure 1A:
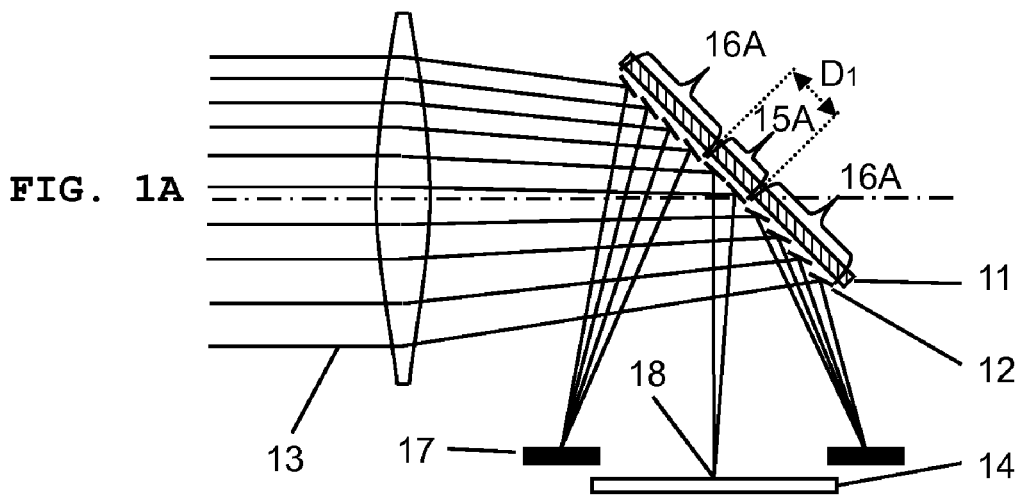
FIGS. 1A-1C are schematic cross-sectional views of an exemplary embodiment of a micromirror array with iris function.
Figure 1B:
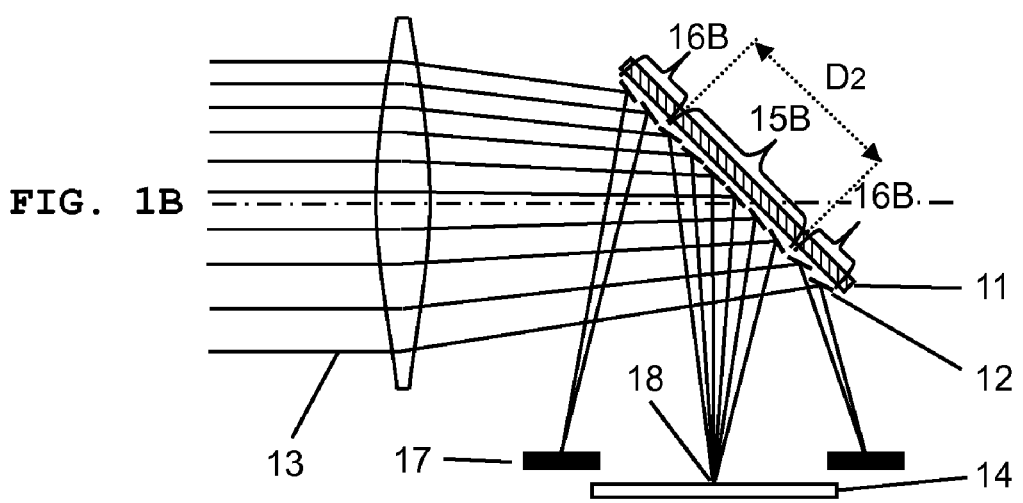
Figure 1C:
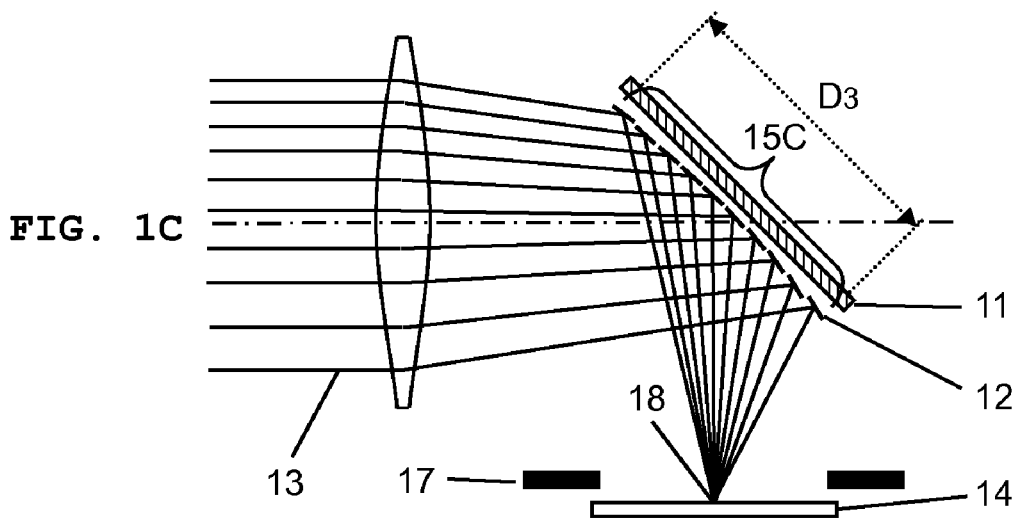

FIGS. 1A-1C are schematic cross-sectional views of an exemplary embodiment of a micromirror array with iris function. A micromirror array with iris function 11 comprises a plurality of micromirrors 12 and is configured to provide an adjustable aperture having a plurality of aperture sizes by controlling motions of the micromirrors 12. Although FIGS. 1A-1C show only three different aperture sizes $D_1$, $D_2$, and $D_3$ for simpler illustration, the micromirror array with iris function 11 of the present invention can provide virtually any required number of aperture sizes. The adjustable aperture controls the amount of incident light 13 admitted to an image sensor 14 by changing the aperture size $D_1$, $D_2$, and $D_3$.

In operation, two groups of micromirrors 12 are selected from the micromirror array 11 for each aperture size to provide the adjustable aperture. One group of micromirrors 12 has active micromirrors 15A, 15B, and 15C forming an aperture. The other group of micromirrors 12 has inactive micromirrors 16A and 16B located out of the aperture formed by the active micromirrors 15A and 15B, respectively. Note that in FIG. 1C, the micromirror array 11 providing a full aperture size (the largest aperture area) $D_3$ does not have inactive micromirrors. However, some micromirror arrays at the full aperture size may have redundant micromirrors that are inactive for all aperture sizes as shown in FIG. 5 and FIG. 8. Whether the micromirror array at the full aperture size has inactive micromirrors depends on the shape of the micromirror array.

The active micromirrors 15A, 15B, and 15C for each aperture size are controlled to reflect incident light 13 onto the image sensor 14 while the inactive micromirrors 16A and 16B are controlled to reflect incident light 13 out of the image sensor 14. A group of the active micromirrors comprised in each aperture size can be predetermined. By simply changing the group of the active micromirrors, the aperture size can be changed discretely.

The micromirror array with iris function 11 can further comprise at least one optical block 17 to absorb incident light 13 reflected by the inactive micromirrors 16A and 16B.

Each micromirror 12 is configured to have a plurality of motions to provide adjustable aperture of the micromirror array, wherein at least one motion is required for the active status and another at least one motion is required for the inactive status. Each micromirror can be configured to have a plurality of motions for both active status and inactive status.

The micromirror array can provide the adjustable aperture using micromirrors having as little as two motions wherein one is for the active status and the other one is for the inactive status. FIGS. 2A-2C show various exemplary embodiments using the micromirrors having two motions. The micromirror arrays with iris function 21A, 21B, and 21C of the present invention have adjustable apertures providing a plurality of aperture sizes by selecting groups of active micromirrors 22A, 22B, and 22C, respectively. Each micromirror 23A, 23B, and 23C in the micromirror arrays 21A, 21B, and 21C is configured to have two motions. The amount of incident light 24A, 24B, and 24C admitted to an image sensor 25A, 25B, and 25C changes as the aperture size DA, DB, and DC changes, respectively. In the embodiment of FIG. 2A, all the micromirrors 23A is configured to have identical motions in active status as well as inactive status. These two motions for an active micromirror 22A and an inactive micromirror 26A in a small circle are magnified in larger circle to provide a better view. All the micromirrors 23A are configured to have identical two motions 22A and 26A. This embodiment allows easier manufacturing process as well as easier operation since all the micromirrors 23A can have identical simple structures providing two identical micromirror motions 22A and 26A.

In the embodiment of FIG. 2B, the micromirror array with iris function 21B comprises micromirrors 23B having two motions. Unlike inactive micromirrors 26A having identical motions shown in FIG. 2A, each micromirror 23B of the micromirror array 21B in FIG. 2B are configured to have independent motions in order to reflect incident light 24B onto at least one optical block 27 when the micromirrors 23B are inactive. The optical block 27 is configured to absorb incident light 24B reflected by the inactive micromirrors 26B. Multiple optical blocks 27 can be used to reduce a light traveling distance across the image sensor 25B when the micromirrors 23B change their statuses; from active to inactive, vice versa. The motions of inactive micromirrors 26B can be predetermined.

When the micromirrors 23A and 23B in FIGS. 2A-2B change their statuses, some noticeable light traversal patterns may occur on an image (e.g. radial traversal pattern). To avoid this problem, FIG. 2C shows an alternative embodiment of the present invention. Each micromirror 23C in the inactive status is configured to have a random motion that makes reflected incident light 28 directed to a random direction out of the image sensor 25C. By saying that the inactive micromirrors 26C have random motions, it means that reflected incident light 28 by the inactive micromirrors 26C does not create any noticeable pattern on the image. These random motions of the inactive micromirrors 26C can be predetermined. The micromirror array of this embodiment can further comprise at least one optical block (not shown) to absorb reflected incident light 28 by the inactive micromirrors 26C.

Although each micromirror shown in the embodiments in FIGS. 2A-2C has only two motions for simple applications, each micromirror of the present invention can be configured to have multiple motions. The general principle, structure and methods for making the multiple motion control of MEMS device are disclosed in U.S. patent application Ser. No. 10/872,241 filed Jun. 18, 2004, U.S. patent application Ser. No. 11/072,597 filed Mar. 4, 2005, U.S. patent application Ser. No. 11/347,590 filed Feb. 4, 2006, U.S. patent application Ser. No. 11/369,797 filed Mar. 6, 2006, U.S. patent application Ser. No. 11/426,565 filed Jun. 26, 2006, U.S. patent application Ser. No. 11/463,875 filed Aug. 10, 2006, U.S. patent application Ser. No. 11/534,613 filed Sep. 22, 2006, U.S. patent application Ser. No. 11/534,620 filed Sep. 22, 2006, U.S. patent application Ser. No. 11/549,954 filed Oct. 16, 2006, U.S. patent application Ser. No. 11/609,882 filed Dec. 12, 2006, U.S. patent application Ser. No. 11/685,119 filed Mar. 12, 2007, U.S. patent application Ser. No. 11/693,698 filed Mar. 29, 2007, and U.S. patent application Ser. No. 11/742,510 filed Apr. 30, 2007, all of which are incorporated herein by references. The micromirrors of the present invention can be configured to have a plurality of motions in the inactive status. Also, the micromirrors of the present invention can be configured to have a plurality of motions in the active status, which provides the micromirror array of the present invention with versatility including iris function, variable focusing function, variable optical axis function, and so on.

Referring back to FIG. 1, while the active and inactive micromirrors define the aperture of a lens system, the active micromirrors can be controlled to change the optical axis of the aperture as will be explained in FIG. 10. Also, the active micromirrors can be controlled to make a focus 18 on an image plane. Since the micromirrors in the active status can have a plurality of motions, the active micromirrors 15A, 15B, and 15C can form a Micromirror Array Lens having at least one optical surface profile by controlling motions of the active micromirrors 15A, 15B, and 15C. The Micromirror Array Lens for each aperture size is a variable focal length lens forming a plurality of optical surface profiles. The focal length of the Micromirror Array Lens discretely changes as the optical surface profile changes.

The aperture size is one of important variables to control the optical properties of a lens system such as f-number and depth of field. The effective f-number of the lens system is a measurement of lens speed and can be controlled by changing the aperture size, wherein larger the aperture size, smaller the f-number. The depth of field is the range of distance in the object side that the image of an object appears in focus. The depth of field is proportional to the f-number of the lens system. In order to provide a specified depth of field, the aperture size has to be changed according to the focal length of the lens system. Thus, the micromirror Array of the present invention can be configured to change the aperture size with respect to the focal length of the Micromirror Array Lens.

Even though the Micromirror Array Lens formed by the micromirror array is a variable focal length lens, the distance between the Micromirror Array Lens and the image plane can be fixed. In this case, the focal length of the Micromirror Array Lens has to be changed as the distance between the Micromirror Array Lens and an object (object distance) is changed based on, for example, the thin lens formula. In order to provide a specified depth of field, the micromirror array has to be configured to change the aperture size with respect to an object distance.

Some electronic image sensors such as CCD or CMOS sensors have a capability of controlling the amount of light admitted to the sensor by using electronic shutter function, wherein a reset time and exposure time of each column or pixel in the image sensor can be controlled. For simultaneous integration and read-out for those sensors, however, the conventional imaging systems have to use an additional mechanical shutter at the cost of larger volume and mass, higher cost, and higher complexity.

The micromirror array with iris function of the present invention can provide simultaneous integration and read-out of the image sensors without yielding those negative effects and also precisely regulates the amount of light admitted to the image sensor. The micromirror array is configured to change its aperture size with synchronization of an exposure of the image sensor. Also, the micromirror array can be configured to change its aperture size during an exposure time of the image sensor. Furthermore, the motions of the micromirrors can be controlled to prevent over-exposure of the image sensor.

More specifically, the motions of the micromirrors are controlled to prevent over-exposure of the image sensor by changing an exposure time of the aperture. The micromirror array can be configured such that all the micromirrors are inactive after exposure time of the image sensor, although it is not necessarily required for some applications such as some video cameras.

Figure 3:
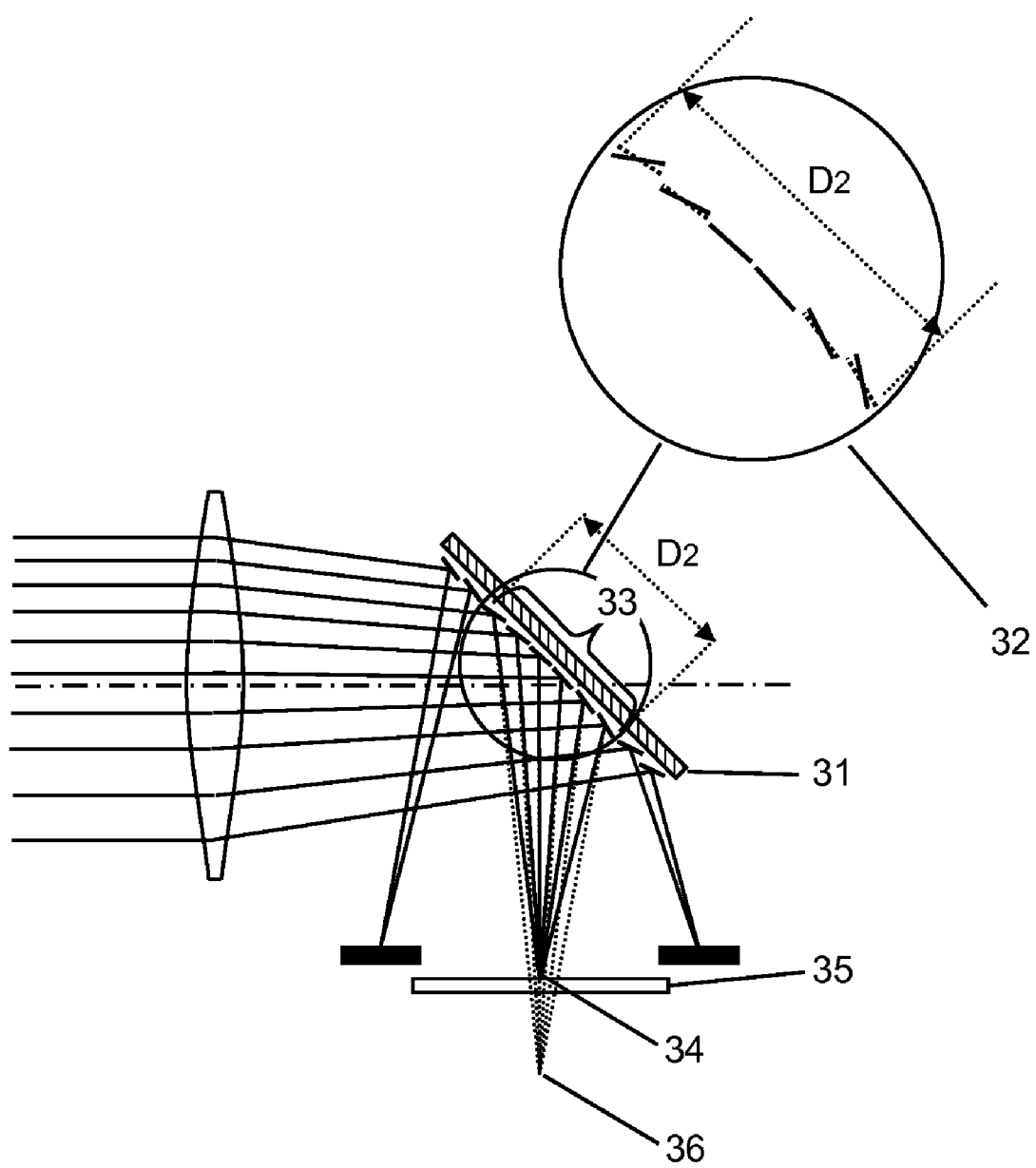
FIG. 3 shows a micromirror array forming a Micromirror Array Lens.

FIG. 3 shows a micromirror array 31 forming a Micromirror Array Lens 32. Active micromirrors 33 form the Micromirror Array Lens 32 having an aperture size $D_2$. The Micromirror Array Lens 32 forms at least one optical surface profile by controlling motions of the active micromirrors 33. The Micromirror Array Lens 32 changes its focal length by changing the optical surface profile. The Micromirror Array Lens 32 can make its focus at a point 34 on an image sensor 35 as well as at other points 36 out of the image sensor 35. The exemplary motions of the active micromirrors 33 in the Micromirror Array Lens 32 are shown in a larger scale in a larger circle. The active micromirrors represented by sold line form one optical surface profile having a focal length while the active micromirrors represented by dotted line forms a different optical surface profile having a different focal length. The micromirror array 31 can form a plurality of Micromirror Array Lenses 32 having different aperture sizes and each Micromirror Array Lens 32 is a variable focal length lens.

To be a good lens, the lens must satisfy two conditions. One is the convergence condition that all light rays scattered from one point of an object should converge into one point of an image plane. The other is the phase matching condition that all converging light rays should have the same phase at the image plane. To satisfy the lens conditions, the surfaces of conventional reflective lenses are formed to have all light rays scattered by one point of an object be converged into one point of the image plane and have the optical path length of all converging light rays be the same.

Each optical surface profile of the Micromirror Array Lens 32 satisfies convergence condition and/or phase matching condition as shown in FIG. 3. The optical surface profile of the Micromirror Array Lens 32 satisfies the convergence condition, wherein arbitrary scattered light rays from one point of the object are converged into one point of the image plane by adjusting the rotational and/or translational motions of each active micromirror 33. Also, the surface profile of the Micromirror Array Lens 32 satisfies the phase matching condition, wherein the phases of all converging light rays are adjusted to be the same by adjusting the rotational and/or translational motions of each active micromirror 33. Even though the optical path lengths of light rays converged by the Micromirror Array Lens are different from those of an equivalent conventional reflective lens, the same phase condition can be satisfied by adjusting the rotational and/or translational motions of each active micromirror 33 because the phase of light is periodic. The required maximum translational displacement is at least half of the wavelength of light. Half wavelength of translational motion is enough to satisfy the same phase condition by use of the periodicity of the light.

The micromirror array with iris function can form various aperture shapes as well as various aperture sizes. The micromirror array can readily form virtually any shapes of the aperture using simple shaped micromirrors such as fan shape, triangular shape, square shape, or hexagonal shape. For a given aperture size D, a circular shaped aperture is defined by micromirrors located inside a circle having a diameter D. When required aperture sizes are predetermined, the shape and arrangement of micromirrors can be optimized to provide the required aperture sizes. FIG. 4 and FIG. 5 show exemplary embodiments of the micromirror array providing a circular shaped adjustable aperture.

Figure 4A:
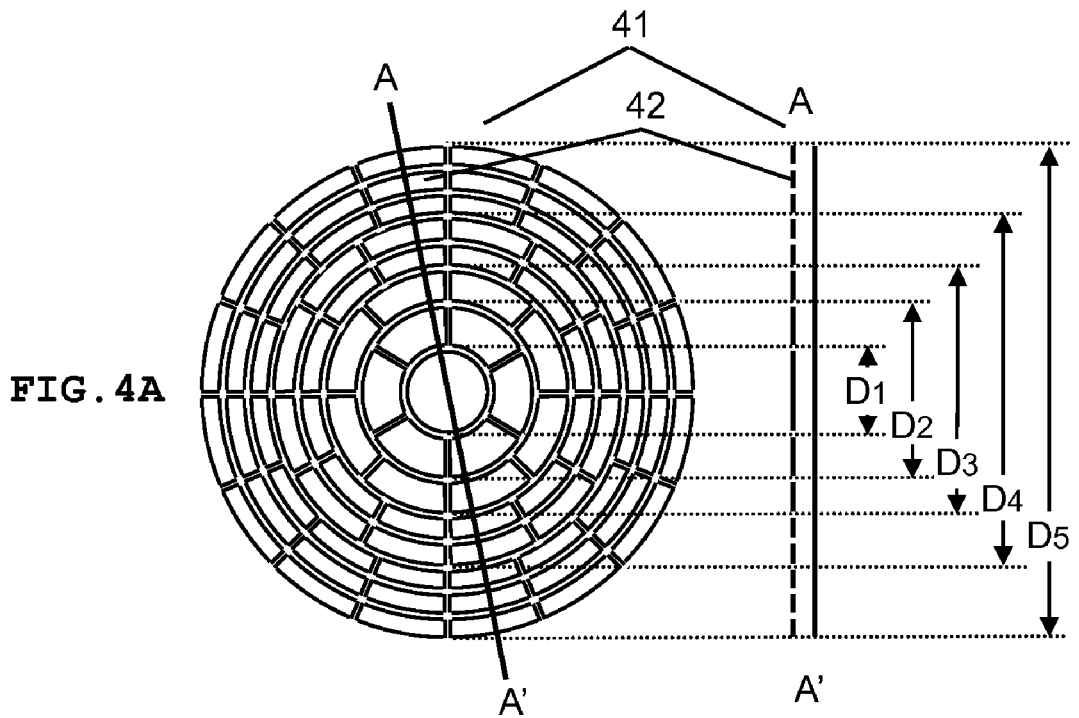
FIGS. 4A-4B show schematic cross-sectional and cut-away side views of the micromirror array providing a circular shaped adjustable aperture using fan shaped micromirrors.
Figure 4B:
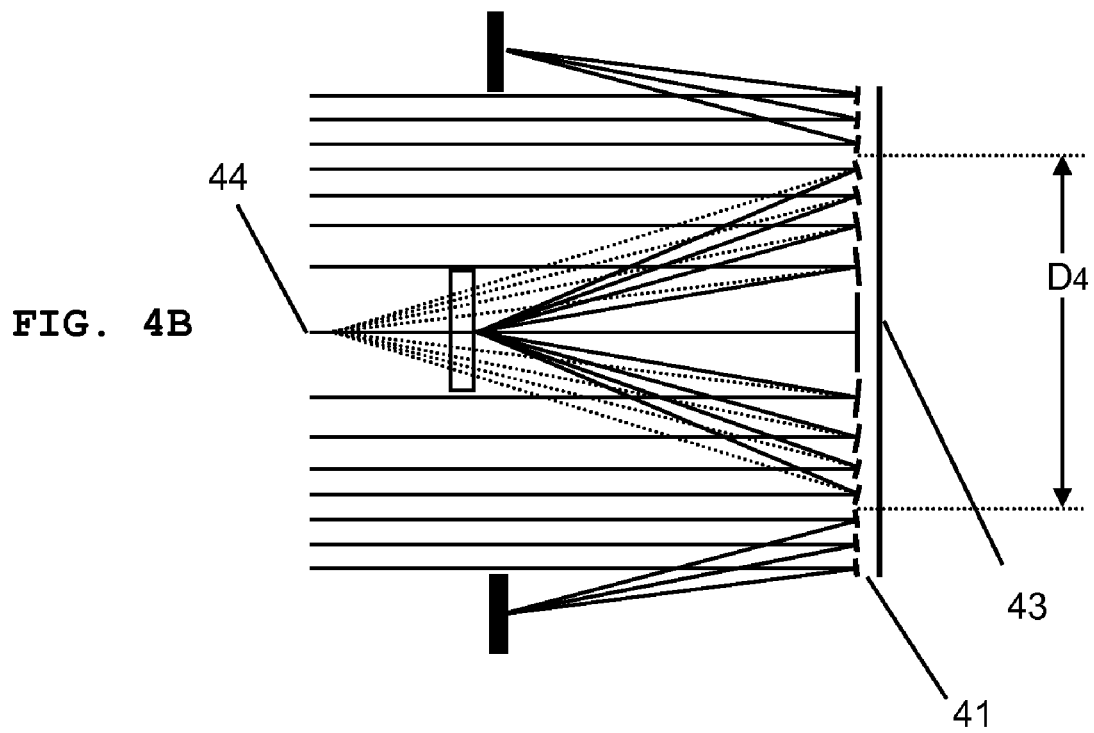

FIG. 4A shows schematic cross-sectional and cut-away side views (along the line AA') of the micromirror array providing a circular shaped adjustable aperture using fan shaped micromirrors. The micromirror array 41 comprises a plurality of fan shape micromirrors arranged in a plurality of concentric circles and provide a plurality of aperture sizes $D_1$-$D_5$, wherein the aperture size is represented by the diameter of the aperture because the aperture shape is circular. The size and location of the micromirrors are optimized to provide required aperture sizes precisely. For a given aperture size D, the micromirrors located inside a circle with the diameter D, become active while the micromirrors located out of the circle become inactive. To provide simple iris function, the micromirrors 42 can be configured to have two motions; one for the active status and the other for the inactive status as in the case of FIG. 2. It is also possible to provide variable focusing function as well as iris function, wherein the micromirrors 42 in the active status are configured to have a plurality of motions as in the case of FIG. 3 to form a Micromirror Array Lens having variable focusing property. The optical surface profiles of the micromirror array can simulate an arbitrary surface shape. Especially, the Micromirror Array Lens of this embodiment facilitates to provide rotationally symmetric optical surface profiles about an optical axis of the adjustable aperture as shown in FIG. 4B. The micromirror array 41 having rotationally symmetric optical surface profiles can be advantageously used in various telescope configurations including Newtonian, Cassegrain, or Gregorian type telescope, wherein the plane 43 of the micromirror array 41 can be disposed perpendicular to an optical axis 44.

Figure 5A:
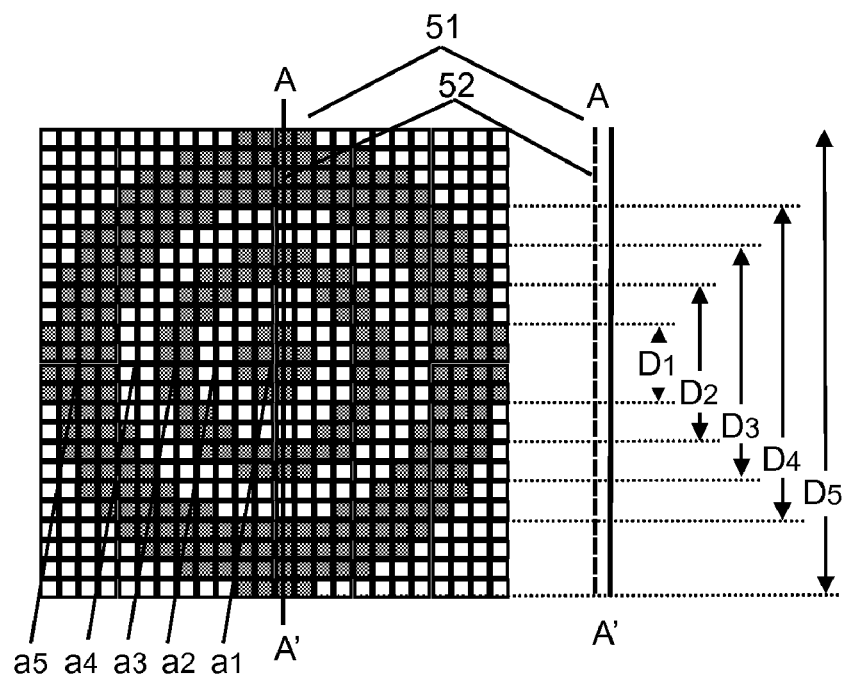
FIGS. 5A-5B show schematic cross-sectional and cut-away side views of the micromirror array providing a circular shaped adjustable aperture using square shaped micromirrors.
Figure 5B:
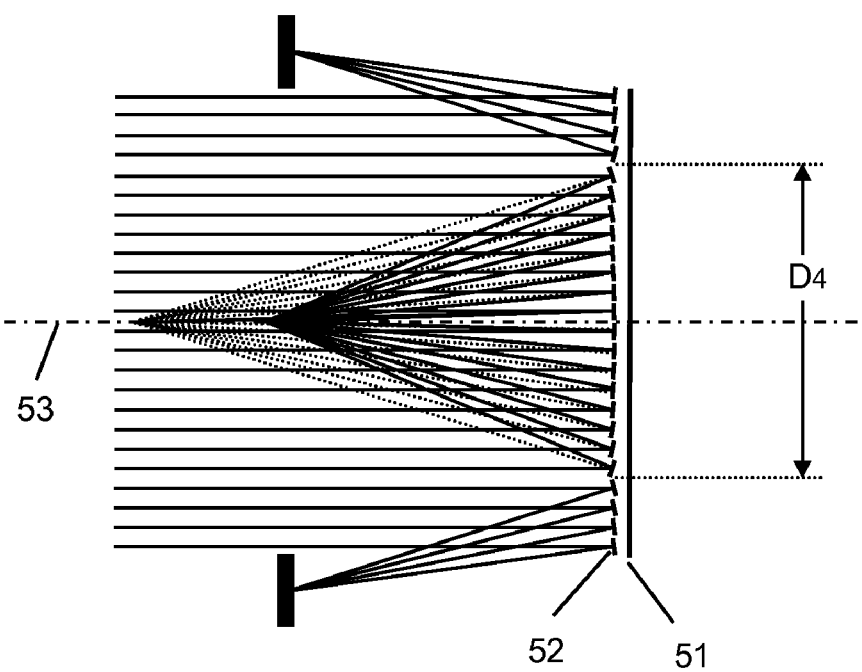

FIG. 5A shows schematic cross-sectional and cut-away side views (along the line AA') of the micromirror array providing a circular shaped adjustable aperture using square shaped micromirrors. The micromirror array 51 provides a circular shaped adjustable aperture having a plurality of aperture sizes $D_1$-$D_5$ in the similar manner as explained for the embodiment of FIG. 4. A group of micromirrors 52 is selected to approximate the circular shaped aperture for each aperture size. For an example, the micromirrors 52 in the micromirror array 51 can be divided into a plurality of areas $a_1$-$a_5$, wherein the aperture with the smallest aperture size $D_1$ is formed by micromirrors in the area $a_1$. The aperture with the second smallest aperture size $D_2$ is formed by micromirrors in areas $a_1$ and $a_2$. Similarly, the aperture with aperture size $D_k$ can be formed by micromirrors in the areas $a_1$-$a_k$. As the size of micromirrors decreases, the required aperture sizes can be approximated more precisely. When the square shaped micromirrors are used, the fabrication process becomes simpler because each micromirror 52 can have identical shape and motions. Besides serving as an iris, the micromirror array 51 using the square shaped micromirrors 52 can form a Micromirror Array Lens having a variable focusing function for each aperture size as shown in FIG. 5B. The Micromirror Array Lens of this embodiment facilitates to provide rotationally symmetric optical surface profiles about an optical axis 53 of the adjustable aperture.

Figure 6A:
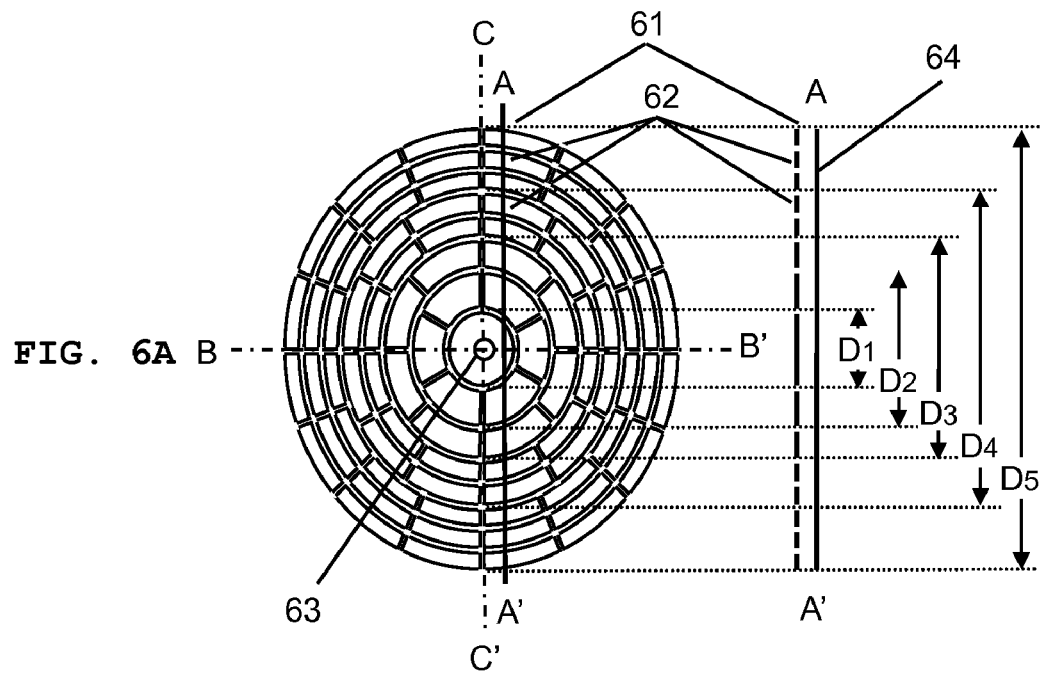
FIGS. 6A-6B show schematic cross-sectional and cut-away side views of the micromirror array obliquely positioned with respect to the optical axis of a lens system and providing an elliptically shaped adjustable aperture using fan shaped micromirrors.
Figure 6B:
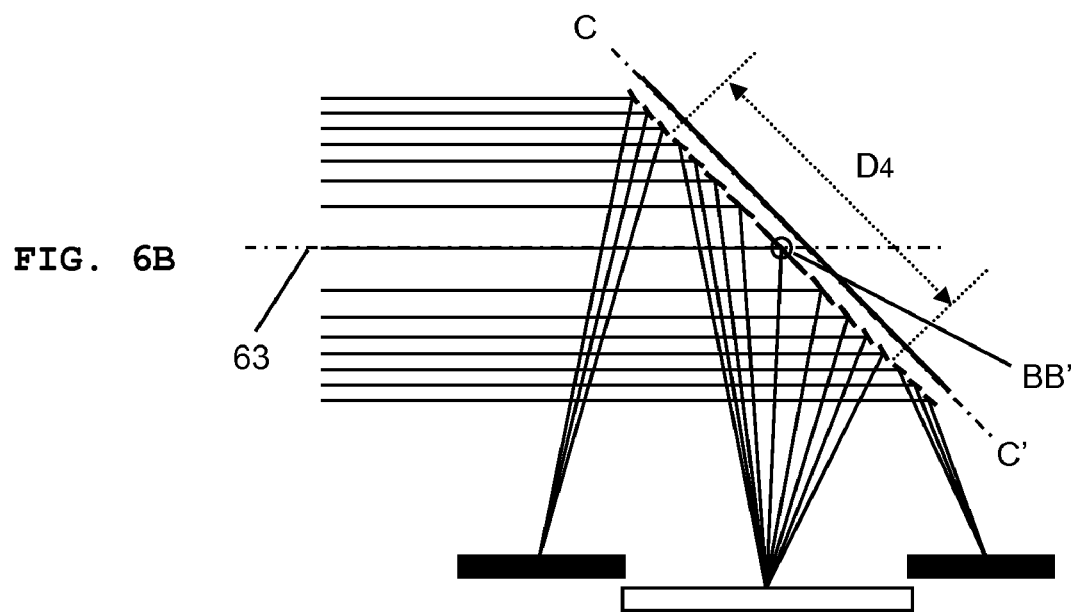

Since the micromirror array is a reflective optical element, the micromirror array is usually positioned obliquely with respect to an optical axis of an imaging system as shown in FIGS. 1, 2, and 3. In this case, the micromirror array can be adapted to provide the aperture having line symmetry. A line of symmetry lies on the plane of the micromirror array and is perpendicular to a tilting axis, wherein the tilting axis is perpendicular to an optical axis of the system. FIG. 6A shows schematic cross-sectional and cut-away side views (along the line AA') of the micromirror array 61 obliquely positioned with respect to the optical axis of a lens system and providing an elliptically shaped adjustable aperture using fan shaped micromirrors 62. The micromirror array 61 provides an elliptically shaped adjustable aperture having a plurality of aperture sizes $D_1$-$D_5$ in the similar manner as explained for the embodiment of FIG. 4. Although the aperture size of the elliptically shape aperture is represented by a major axis of the ellipse for simplicity, the actual aperture size has to be represented by the aperture area. A line BB' is a tilting axis of the micromirror array and perpendicular to the optical axis 63. The line of symmetry CC' lies on the plane 64 of the micromirror array 61 and is perpendicular to the tilting axis BB'. The micromirror array 61 can form a Micromirror Array Lens having a variable focusing function for each aperture size as shown in FIG. 6B. The Micromirror Array Lens of this embodiment facilitates to provide optical surface profiles symmetric about the line of symmetry CC'. The configuration works best for imaging collimated beam (parallel beam).

Figure 7:
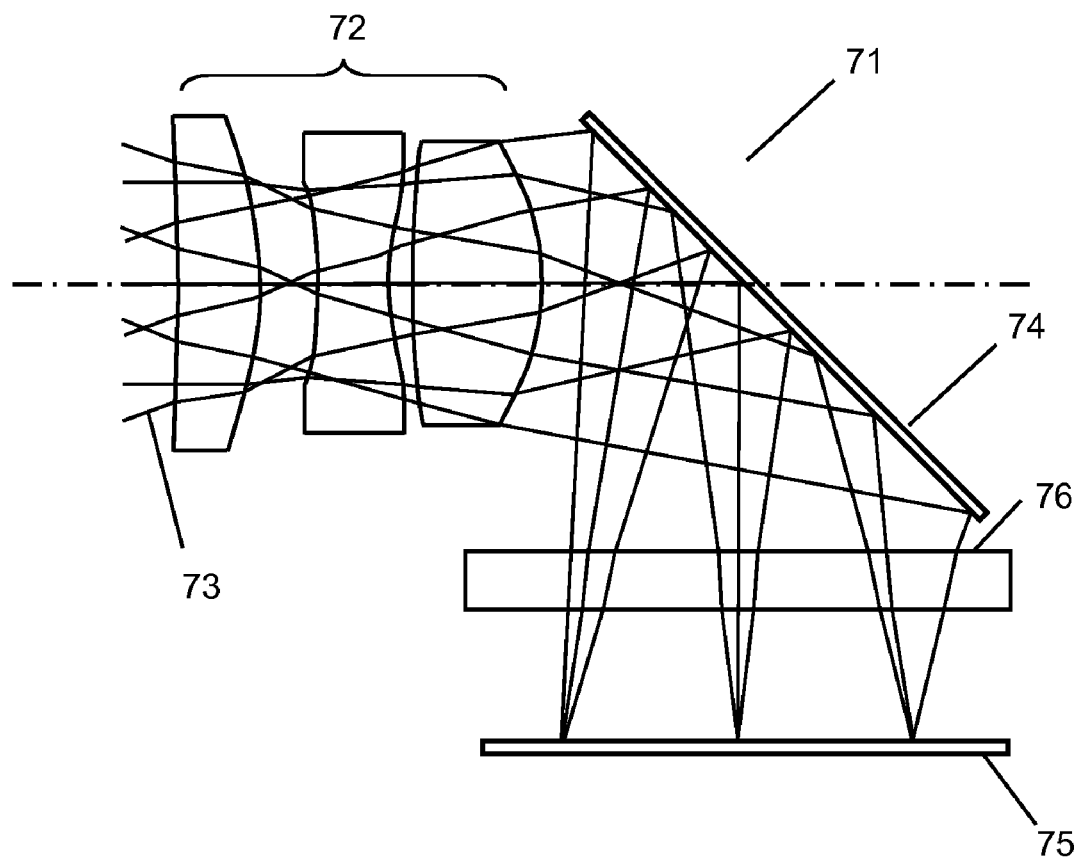
FIG. 7 shows an optical arrangement of an imaging system using a reflective surface.

FIG. 7 shows a typical optical arrangement of an imaging system using a reflective surface. The imaging system 71 comprises a lens group 72 to focus incident light 73, a reflective surface 74 to reflect incident light 73, and an image sensor 75 to detect incident light 73. The imaging system 71 can further comprise an image filter 76 to enhance image quality. A micromirror array can be used in place of the reflective surface 74. While the reflective surface 74 provides only reflection to the image sensor 75, the micromirror array provides variable focusing function as well as iris function. In this configuration, the adjustable aperture of the micromirror array requires to have a line symmetry, wherein the line of symmetry lies on the plane of the micromirror array and is perpendicular to a tilting axis, wherein the tilting axis is perpendicular to an optical axis of the lens system.

Figures 8A, 8B:
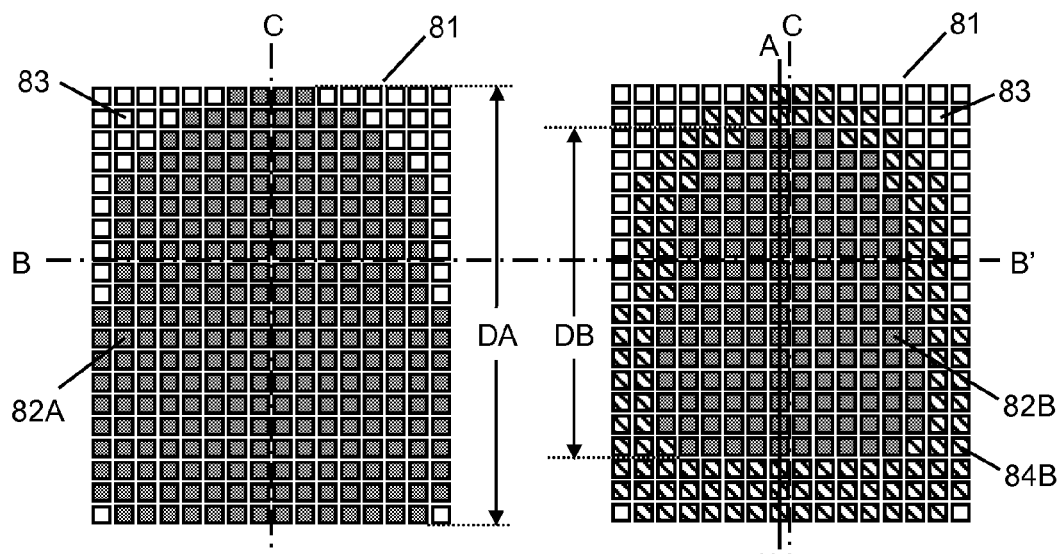
FIGS. 8A-8D shows a micromirror array providing an adjustable aperture having line symmetry using square shaped micromirrors.
Figures 8C, 8D:
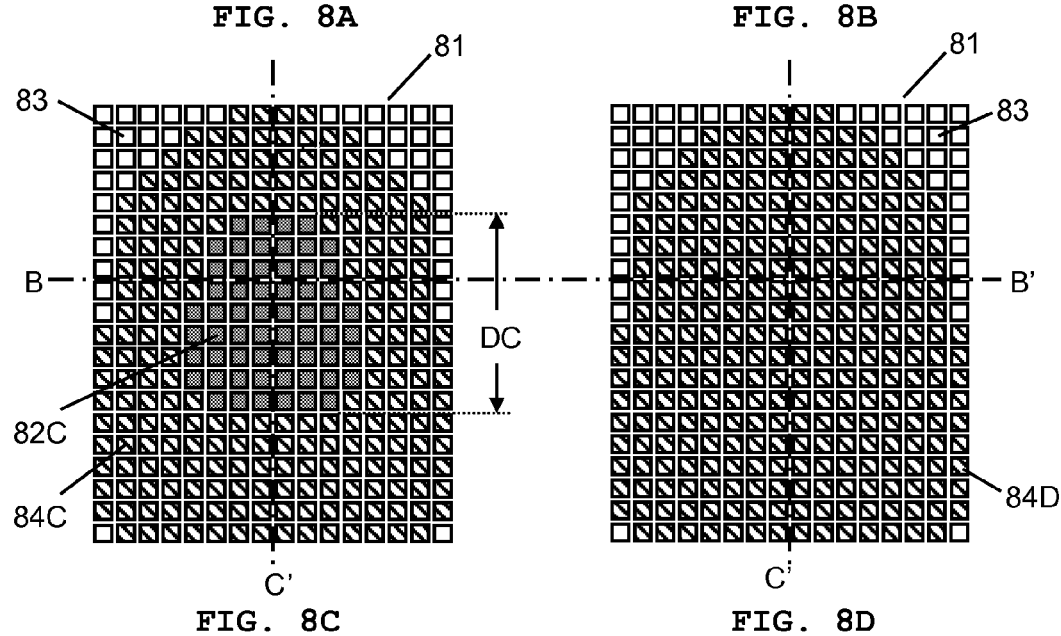

FIGS. 8A-8D shows a micromirror array providing an adjustable aperture having line symmetry using square shaped micromirrors. The micromirror array 81 comprises a plurality of square shaped micromirrors and the adjustable aperture having a plurality of aperture sizes DA-DC, even zero aperture size in FIG. 8D. Although the aperture size of the line symmetry aperture is represented by a longest diameter of the aperture for simplicity, the actual aperture size has to be represented by the aperture area. The micromirror array forms a line symmetry aperture about a line of symmetry CC' which lies on the plane of the micromirror array 81 and is perpendicular to the tilting axis BB'. The tilting axis of the micromirror array 81 is perpendicular to an optical axis. FIG. 8A shows a line symmetry aperture having a full aperture size provided by the micromirror array 81. The shaded micromirrors 82A are active and controlled to reflect incident light onto the image sensor. There are residual micromirrors 83 that are inactive for any aperture size due to the restriction on the aperture geometry. These residual micromirrors (ineffective area) can be anti-reflective coated to enhance the optical quality of the imaging system. The details are explained in U.S. patent application Ser. Nos. 11/534,613 and 11/534,620 filed Sep. 22, 2006, which are incorporated herein by references. FIGS. 8B and 8C shows the line symmetry apertures having smaller aperture sizes than that of FIGS. 8A and 8B, respectively. The shaded micromirrors 82B and 82C are active and controlled to reflect incident light onto the image sensor. The rest of the micromirrors 84B and 84C (hatched) as well as the residual micromirrors 83 are inactive and controlled to reflect incident light out of the image sensor. FIG. 8D shows the case that the aperture is closed, wherein all the micromirrors 83 and 84D in the micromirror array are inactive and controlled to reflect incident light out of the image sensor. Each micromirror can be configured to provide a plurality of motions when the micromirror is active. In this case, the active micromirrors 82A, 82B and 82C can form a Micromirror Array Lens having a variable focusing function.

Figure 9:
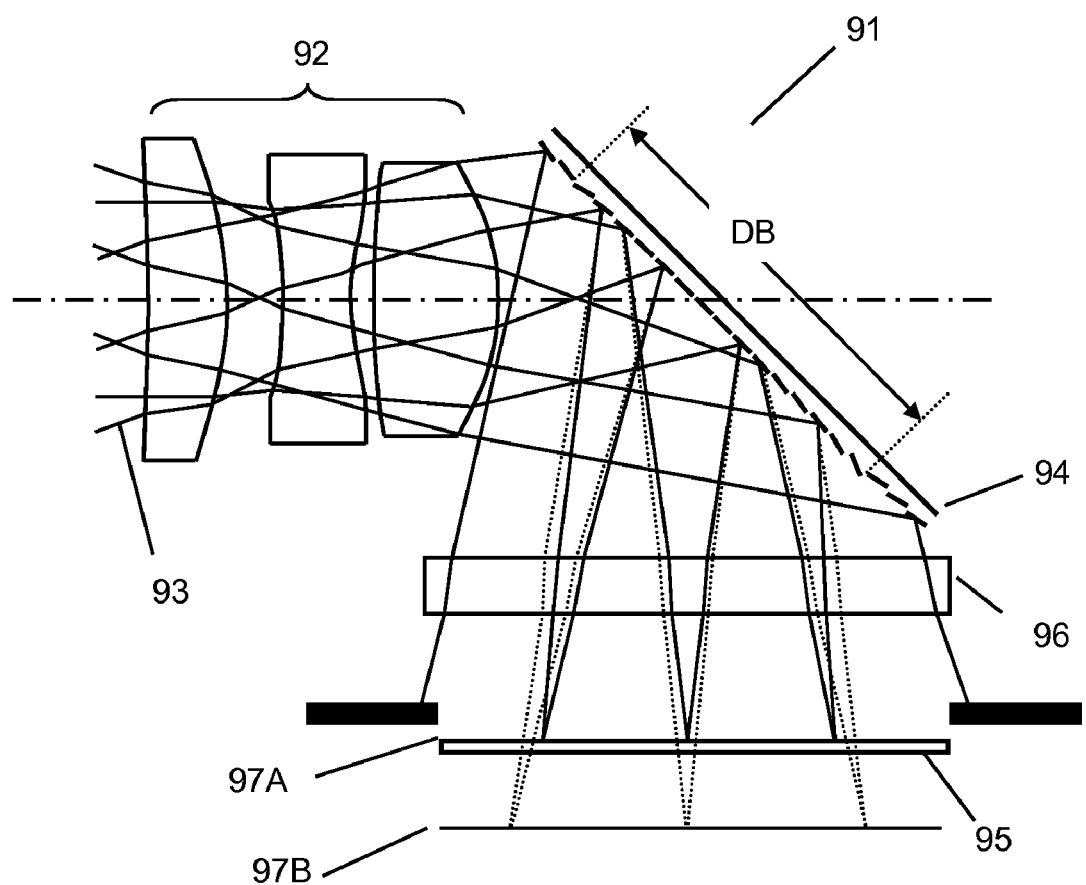
FIG. 9 shows a schematic cut-away side view of the micromirror array providing an adjustable aperture having line symmetry using square shaped micromirrors.

FIG. 9 shows a schematic cut-away side view (along the line AA' in FIG. 8B) of the micromirror array providing an adjustable aperture having line symmetry using square shaped micromirrors. The imaging system 91 comprises a lens group 92 to focus incident light 93, a micromirror array 94 to refocus incident light 93, and an image sensor 95 to detect incident light 93. The imaging system 91 can further comprise an image filter 96 to enhance image quality. The micromirror array 94 provides the line symmetry adjustable aperture having an aperture sizes DB. Besides serving as an iris, the micromirror array 94 can form a Micromirror Array Lens having a variable focusing function for each aperture size. FIG. 9 demonstrate this variable focusing function of the Micromirror Array Lens with the aperture size DB, where the Micromirror Array Lens is capable of focusing incident light on different image planes 97A and 97B.

Figure 10A:
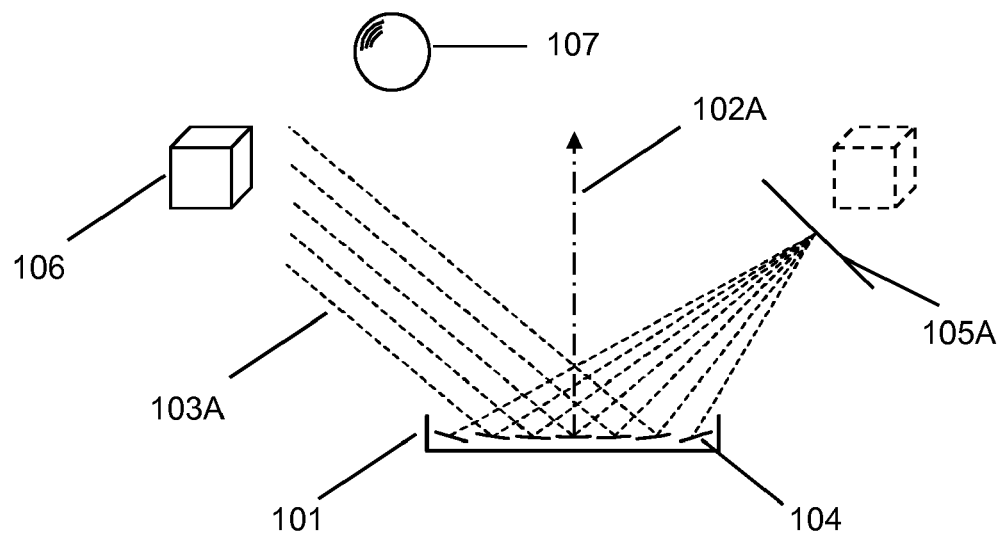
FIGS. 10A-10B are schematic diagrams showing how a Micromirror Array Lens changes its optical axis.
Figure 10B:
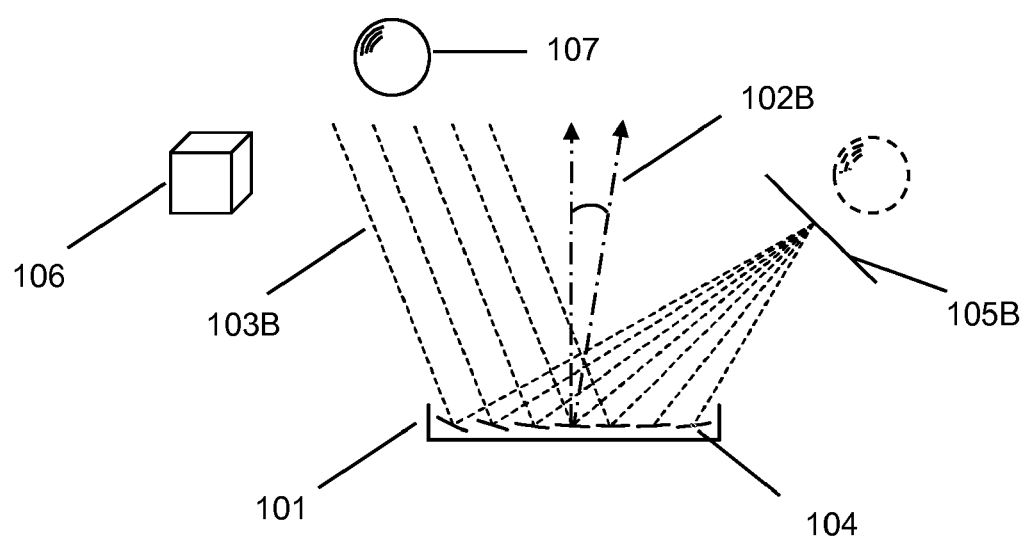

FIGS. 10A and 10B are schematic diagrams showing how a Micromirror Array Lens 101 changes its optical axis 102A and 102B. The incident light 103A and 103B are focused by Micromirror Array Lens 101. The collected beam is reflected by the surface of each micromirror 104 and then finally focused onto image plane 105A and 105B. The Micromirror Array Lens 101 can change its optical axis by changing the angles of each micromirror 104. In FIG. 10A, a cube object 106 is imaged on the image plane 105A while the optical axis 102A is maintained as the normal direction of the Micromirror Array Lens 101. Also in FIG. 10B, a sphere object 107 is imaged on the image plane 105B with a tilted optical axis 102B. The Micromirror Array Lens 101 changes its optical axis without macroscopic movement of the Micromirror Array Lens.

In stead of providing a plurality of fixed size Micromirror Array Lenses, the micromirror array can form a Micromirror Array Lens with iris function comprises a plurality of micromirrors, configured to provide an adjustable aperture having a plurality of aperture sizes by controlling motions of the micromirrors, wherein the amount of incident light admitted to an image sensor changes as the aperture size of the Micromirror Array Lens changes.

The aperture size of the Micromirror Array Lens is changed by selecting two groups of micromirrors from the Micromirror Array Lens. One group of micromirrors has active micromirrors forming an aperture of the Micromirror Array Lens and the other group of micromirrors has inactive micromirrors located out of the aperture formed by the active micromirrors. The active micromirrors are controlled to reflect incident light onto the image sensor and the inactive micromirrors are controlled to reflect incident light out of the image sensor. The micromirrors are configured to have independent motions.

The aperture size of the Micromirror Array Lens can be changed discretely. The Micromirror Array Lens with the adjustable aperture is a variable focal length lens forming a plurality of optical surface profiles by controlling motions of the active micromirrors. Each optical surface profile of the Micromirror Array Lens satisfies convergence and phase matching conditions. The optical surface profile of the Micromirror Array Lens simulates an arbitrary surface shape. The Micromirror Array Lens is configured to change the aperture size with respect to the focal length of the Micromirror Array Lens.

The focal length of the Micromirror Array Lens can be discretely changed as the optical surface profile is changed. The micromirror array Lens is configured to change the aperture size with respect to an object distance. An optical axis of the Micromirror Array Lens is changed by controlling motions of the active micromirrors. The Micromirror Array Lens can further comprise at least one optical block to absorb incident light reflected by the inactive micromirrors.

While the invention has been shown and described with reference to different embodiments thereof, it will be appreciated by those skills in the art that variations in form, detail, compositions and operation may be made without departing from the spirit and scope of the present invention as defined by the accompanying claims.

What is claimed is:

1. A micromirror array with iris function comprising a plurality of micromirrors, configured to provide an adjustable aperture having a plurality of aperture sizes by controlling motions of the micromirrors, wherein the adjustable aperture controls the amount of incident light admitted to an image sensor by changing the aperture size.

2. The micromirror array with iris function of claim 1, wherein two groups of micromirrors are selected from the micromirror array for each aperture size to provide the adjustable aperture, wherein one group of micromirrors has active micromirrors forming an aperture and the other group of micromirrors has inactive micromirrors located out of the aperture formed by the active micromirrors.

3. The micromirror array with iris function of claim 2, wherein the active micromirrors are controlled to reflect incident light onto the image sensor.

4. The micromirror array with iris function of claim 3, further comprising at least one optical block to absorb incident light reflected by the inactive micromirrors.

5. The micromirror array with iris function of claim 2, wherein the inactive micromirrors are controlled to reflect incident light out of the image sensor.

6. The micromirror array with iris function of claim 2, wherein the micromirrors are configured to have substantially identical motions when the micromirrors are active.

7. The micromirror array with iris function of claim 2, wherein the micromirrors are configured to have substantially identical motions when the micromirrors are inactive.

8. The micromirror array with iris function of claim 2, wherein the micromirrors are configured to have random motions when the micromirrors are inactive in order to reflect incident light to random directions pointing out of the image sensor.

9. The micromirror array with iris function of claim 2, wherein the active micromirrors in the micromirror array form a Micromirror Array Lens having at least one optical surface profile by controlling motions of the active micromirrors.

10. The micromirror array with iris function of claim 9, wherein the Micromirror Array Lens for each aperture size is a variable focal length lens forming a plurality of optical surface profiles.

11. The micromirror array with iris function of claim 10, wherein the Micromirror Array is configured to change the aperture size with respect to the focal length of the Micromirror Array Lens.

12. The micromirror array with iris function of claim 10, wherein the focal length of the Micromirror Array Lens is discretely changed as the optical surface profile is changed.

13. The micromirror array with iris function of claim 9, wherein each optical surface profile of the Micromirror Array Lens satisfies convergence condition.

14. The micromirror array with iris function of claim 9, wherein each optical surface profile of the Micromirror Array Lens satisfies phase matching condition.

15. The micromirror array with iris function of claim 9, wherein the optical surface profile of the Micromirror Array Lens has rotational symmetry about an optical axis of the aperture.

16. The micromirror array with iris function of claim 9, wherein the optical surface profile of the Micromirror Array Lens has symmetry about a line of symmetry, wherein the line of symmetry lies on the plane of the Micromirror Array Len and is perpendicular to a tilting axis, wherein the tilting axis is perpendicular to an optical axis of a lens system.

17. The micromirror array with iris function of claim 9, wherein the optical surface profile of the Micromirror Array Lens simulates an arbitrary surface shape.

18. The micromirror array with iris function of claim 2, wherein an optical axis of the aperture is changed by controlling motions of the active micromirrors.

19. The micromirror array with iris function of claim 2, wherein the group of the active micromirrors comprised in each aperture size are predetermined.

20. The micromirror array with iris function of claim 19, wherein the aperture size is changed discretely.

21. The micromirror array with iris function of claim 1, wherein each micromirror in the micromirror array is configured to have at least two motions to determine the aperture size.

22. The micromirror array with iris function of claim 1, wherein the micromirrors in the micromirror array are configured to have independent motions.

23. The micromirror array with iris function of claim 1, wherein the amount of incident light admitted to the image sensor is controlled by changing the aperture size.

24. The micromirror array with iris function of claim 1, wherein an effective f-number of a lens system is controlled by changing the aperture size.

25. The micromirror array with iris function of claim 1, wherein the aperture size is changed with synchronization of an exposure of the image sensor.

26. The micromirror array with iris function of claim 1, wherein the aperture size is changed during an exposure time of the image sensor.

27. The micromirror array with iris function of claim 1, wherein the micromirror array is configured to change the aperture size with respect to an object distance.

28. The micromirror array with iris function of claim 1, wherein all the micromirrors in the micromirror array are inactive after exposure time of the image sensor.

29. The micromirror array with iris function of claim 1, wherein the motions of the micromirrors are controlled to prevent over-exposure of the image sensor.

30. The micromirror array with iris function of claim 1, wherein the motions of the micromirrors are controlled to prevent over-exposure of the image sensor by changing an exposure time of the aperture.

31. A Micromirror Array Lens with iris function, comprising a plurality of micromirrors, configured to provide an adjustable aperture having a plurality of aperture sizes by controlling motions of the micromirrors, wherein the amount of incident light admitted to an image sensor changes as the aperture size of the Micromirror Array Lens changes.

32. The Micromirror Array Lens with iris function of claim 31, wherein the aperture size of the Micromirror Array Lens is changed by selecting two groups of micromirrors from the Micromirror Array Lens, wherein one group of micromirrors has active micromirrors forming an aperture of the Micromirror Array Lens and the other group of micromirrors has inactive micromirrors located out of the aperture formed by the active micromirrors, wherein the active micromirrors are controlled to reflect incident light onto the image sensor and the inactive micromirrors are controlled to reflect incident light out of the image sensor.

33. The Micromirror Array Lens with iris function of claim 32, wherein the Micromirror Array Lens with the adjustable aperture is a variable focal length lens forming a plurality of optical surface profiles by controlling motions of the active micromirrors.

34. The Micromirror Array Lens with iris function of claim 33, wherein each optical surface profile of the Micromirror Array Lens satisfies convergence and phase matching conditions.

35. The Micromirror Array Lens with iris function of claim 33, wherein the optical surface profile of the Micromirror Array Lens simulates an arbitrary surface shape.

36. The Micromirror Array Lens with iris function of claim 33, wherein the Micromirror Array Lens is configured to change the aperture size with respect to the focal length of the Micromirror Array Lens.

37. The Micromirror Array Lens with iris function of claim 33, wherein the focal length of the Micromirror Array Lens discretely changes as the optical surface profile changes.

38. The Micromirror Array Lens with iris function of claim 32, wherein an optical axis of the Micromirror Array Lens is changed by controlling motions of the active micromirrors.

39. The Micromirror Array Lens with iris function of claim 31, wherein the micromirrors are configured to have independent motions.

40. The Micromirror Array Lens with iris function of claim 32, further comprising at least one optical block to absorb incident light reflected by the inactive micromirrors.

41. The Micromirror Array Lens with iris function of claim 31, wherein the micromirror array Lens is configured to change the aperture size with respect to an object distance.

* * * * *